United States Patent [19]

Tuckey

[11] 3,975,468

[45] Aug. 17, 1976

[54] MOUNT FOR CARBURETORS

[75] Inventor: Charles H. Tuckey, Cass City, Mich.

[73] Assignee: Walbro Corporation, Cass City, Mich.

[22] Filed: Oct. 21, 1974

[21] Appl. No.: 516,462

[52] U.S. Cl. .............................. 261/65; 123/52 M; 285/49; 285/368; 285/414

[51] Int. Cl.² .................. F02M 17/00; F02B 77/00; F16L 23/00

[58] Field of Search ...................... 261/65, DIG. 68; 123/52 M, 52 MV, 122 R, 119 R; 285/49, 368, 414

[56] References Cited

UNITED STATES PATENTS

| | | | |
|---|---|---|---|
| 1,186,621 | 6/1916 | Townsend | 285/414 X |
| 3,114,669 | 12/1963 | Herbst | 123/52 M |
| 3,284,065 | 11/1966 | Mennesson | 261/65 |
| 3,376,890 | 4/1968 | Hanson et al. | 261/65 X |
| 3,627,357 | 12/1971 | Sanders | 285/368 X |
| 3,690,304 | 9/1972 | Tuckey | 123/73 |
| 3,761,114 | 9/1973 | Blakeley | 285/368 X |
| 3,782,343 | 1/1974 | Notaras et al. | 261/65 X |
| 3,866,926 | 2/1975 | Traum | 261/65 X |

*Primary Examiner*—Wendell E. Burns
*Assistant Examiner*—Sheldon Richter
*Attorney, Agent, or Firm*—Barnes, Kisselle, Raisch & Choate

[57] ABSTRACT

A mount for a carburetor which reduces the transfer of heat and vibration from an engine which includes an elastic support ring interposed, with a load carrying capacity, between the mounting flanges of the engine and the carburetor and a neck portion of the carburetor to eliminate metal-to-metal contact. The neck portion has an axial length sufficient to receive the carburetor mounting flange while the elastic support ring is assembled.

5 Claims, 2 Drawing Figures

MOUNT FOR CARBURETORS

This invention relates to a Mount for Carburetors and more particularly to a design for mounting a carburetor body on an engine in a manner to reduce the vibration of the carburetor body.

Most carburetors are mounted on and supported by the engine to which fuel is furnished. Since most engines, particularly small engines used for lawnmowers, snow vehicles, chain saws, are subject to rather great vibration when running, this, when transmitted to the carburetor, can cause fuel problems. The carburetor valves are influenced by the motion and the fuel may tend to foam causing loss of intended control of supply rates.

Rubber gaskets have been used previously between a carburetor and engine to serve as heat barriers (see U.S. Pat. No. 3,690,304, dated Sept. 12, 1972) but these have not served to reduce vibration materially.

An object of the present invention is the provision of a carburetor design which lessens the transmission of vibratory motion of the engine.

A further object is the provision of a mount which reduces heat transfer from engine to carburetor and which is relatively inexpensive and easy to install.

Other objects and features of the invention relating to details of design and construction will be apparent in the following description and claims wherein there is set forth the principles of operation of the invention and the manner of using it in connection with the best mode presently contemplated for practicing the invention.

Figure 1:
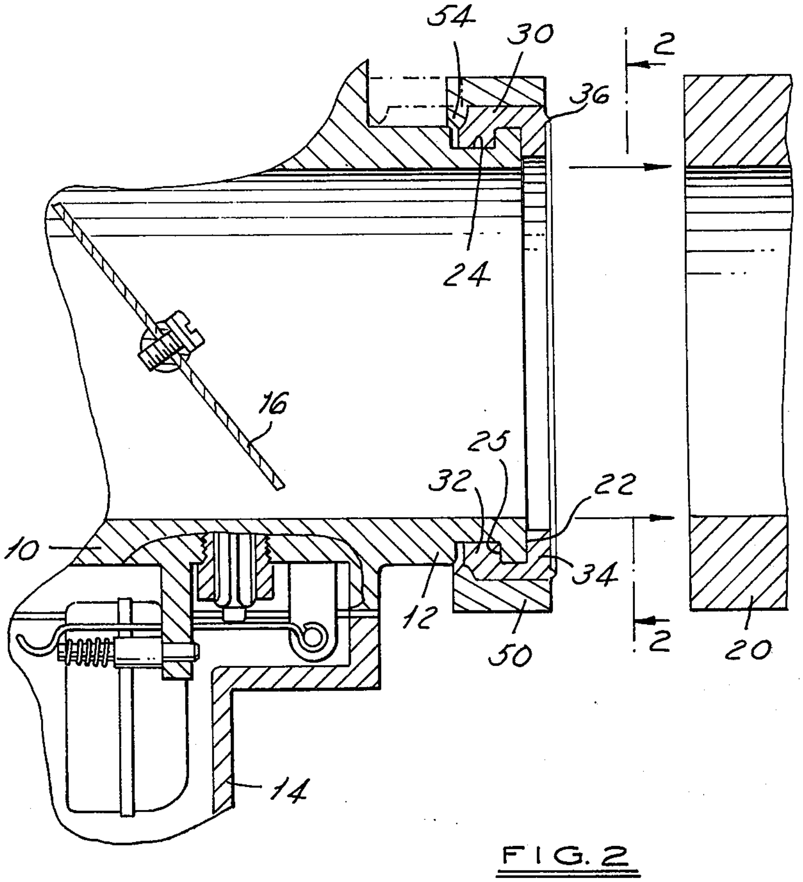

DRAWINGS accompany the disclosure and the various views thereof may be briefly described as:

FIG. 1, a sectional view of a portion of a carburetor showing the mount.

Figure 2:
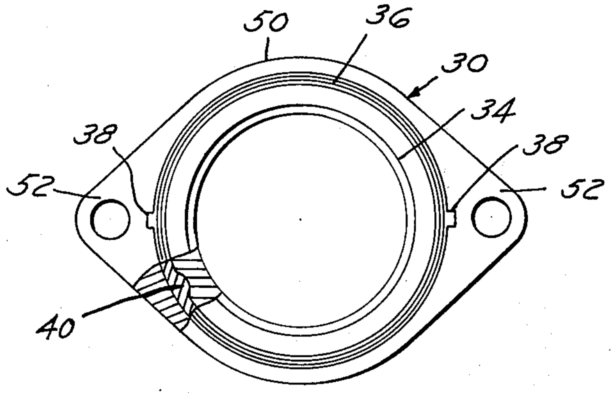

FIG. 2, an elevation taken on line 2—2 of FIG. 1.

Referring to the drawings:

A carburetor body 10 is partially shown having an outlet neck portion 12, a float chamber 14 and a control valve 16. The neck portion is to be fastened to a flange 20 on an engine.

The neck 12 is made with a flat outer surface 22 and an annular groove 24 spaced inside this surface. The groove terminates in a radial shoulder 25 which lies in a plane parallel to the outer surface 22.

The connection joint with the engine is a two-part construction. A synthetic ring 30 has an annular inwardly extending portion 32 which is received in the groove 24 and abuts at one end against the shoulder. The body of the ring 30 extends outwardly and terminates in an annular ring portion 34 which overlies the face surface 22 of the carburetor mount flange.

A small annular ridge 36 extends from face surface of the ring 30 to serve as a seal with the face of the engine body mount flange 20. The ring 30 has also two opposed, outwardly extending radial projections or nibs 38 (FIG. 2) which locate the ring relative to the clamping ring. The inner surface of the ring 30 has inward projections 40 which register with notches in the outer surface of the ring 22 on the carburetor body to provide circumferential stability.

The ring 30 is clamped into place against an engine mount by a clamping ring 50 provided with ear portions 52 to be bolted to a similarly shaped flange 20 on the engine body. The ring 50 is generally cylindrical in cross-section as shown in FIG. 1 with the exception of a small, inwardly-extending annular retainer protuberance 54 which has an inner diameter slightly larger than the neck portion 12 and fits against an outside corner of the ring 30 on the carburetor side as shown in assembled position in FIG. 1.

In assembly, the flanged ring 50 is slipped over the neck portion 12 and moved to a clearance position (dotted lines — FIG. 1) which exposes the groove 24. The neck 12 must be long enough to permit this movement. The elastic, synthetic ring 30 is then placed in position in the groove, the respective grooves and annular portions interfitting as shown in the assembly view. The ring 50 is then moved outward to overlie ring 30. The ring is compressed and clamped between the annular protuberance 54 and the shoulder 25 and there will be metal-to-metal contact between the clamping ring 50 and the engine mount flange 20. It will be noted, however, that there is no direct contact between ring 50 and the carburetor housing in the assembled position.

The elastic ring 30 is to be made of a material which is resistant to destruction by hydrocarbons such as oil and gasoline. It is preferably made from a synthetic rubber which is available from a number of sources. The object of the described connection is a reduction in heat transfer from engine to carburetor and a reduction in the transmission of vibration from engine to carburetor.

It will be appreciated that the durometer hardness of the elastic ring 30 will affect the functioning. It is desirable that the ring be as hard as possible while soft enough to prevent foaming of fuel in the carburetor when the engine is running. The carburetor is mounted in a cantilever fashion on the engine and thus the weight of the carburetor, filter, and air silencer will be a factor in the selection of the ring material.

One method of selecting the material is to mount a carburetor on an engine and put a window in the carburetor housing so the fuel can be observed. The engine is then run at all speeds, idle and full throttle, under no-load and load conditions. If foaming of fuel is observed in the carburetor, a softer ring is installed and so on until the foaming is eliminated.

I claim:

1. A carburetor mount assembly for cantilever mounting of a carburetor on an engine to reduce heat and vibration transmission which comprises:

a. a neck portion on the carburetor to be fastened to an engine, said neck portion having an annular surface groove spaced from the end of the neck portion and a face surface on the end of the neck portion, b. an elastic ring surrounding said neck portion having an annular flange portion interfitting within said groove and a radially inwardly extending portion overlying said face surface, and c. a clamping ring adapted to be fastened interfacially to an engine surrounding said elastic ring having an inner annular portion to engage axially with the said elastic ring on a radial surface to exert an axial pressure thereon adjacent said annular flange portion in a clamping position and an axially extending portion overlying and confining said ring between said radial surface and said end portion of said neck portion.

2. A carburetor mount assembly as defined in claim 1 in which the neck portion has an axial dimension to receive the clamping ring leaving exposed the annular surface groove to permit assembly of the elastic ring.

3. A carburetor mount assembly for cantilever mounting of a carburetor on an engine to reduce heat and vibration transmission which comprises:

a. a circular carburetor neck portion on a carburetor body having an integral annular ring outside an annular groove in an end surface thereof, b. an elastic ring at the end of said neck portion having an annular groove receiving said annular ring and having an annular ring portion received in the groove of said neck portion, and c. a clamping ring in contact with said elastic ring and out of contact with said neck portion to hold said annular rings in firm contact with said annular grooves, d. said means on said neck portion, said elastic ring and said clamping ring interengaging axially and circumferentially to provide a secure but resilient connection between a carburetor and an engine.

4. A carburetor mount assembly for cantilever mounting of a carburetor on an engine to reduce heat and vibration transmission which comprises:

a. a carburetor and engine, one of which has a neck portion to be clamped to the other to form the sole support for the carburetor on the engine, b. said neck portion having an integral annular ring outside an annular groove in an end surface thereof, c. an elastic ring at the end of said neck portion having an annular groove receiving said annular ring and an annular ring portion received in the groove of said neck portion, and d. a clamping ring in contact with the periphery of said elastic ring and out of contact with said neck portion to hold said annular rings in firm contact with said annular grooves, e. said means on said neck portion, said elastic ring and said clamping ring interengaging axially and circumferentially to provide a secure but resilient connection between said carburetor and said engine.

5. A carburetor mount assembly for cantilever mounting of a carburetor on an engine to reduce heat and vibration transmission which comprises:

a. a carburetor neck portion on a carburetor body to be mounted on an engine, b. an elastic ring around said neck portion, c. annular groove means and ring means on said neck portion and said ring portion dimensioned to interfit axially and radially, and d. a clamping ring having portions to be clamped to an engine and dimensioned to overlie said elastic ring axially out of contact with said neck portion and having annular means to apply axial pressure to one end of said elastic ring spaced away from said engine, the other end of said ring being fashioned to seal against a surface on said engine, whereby said clamping ring applies axial confining pressure on said interfitting groove and ring means and also urges said ring against an engine surface in sealing relation.

* * * * *